(12) United States Patent
Lind et al.

(10) Patent No.: US 9,415,736 B2
(45) Date of Patent: Aug. 16, 2016

(54) METHOD, COMPUTER PROGRAM PRODUCT AND SYSTEM FOR UTILIZING VEHICLE SAFETY EQUIPMENT

(75) Inventors: Henrik Lind, Torslanda (SE); Martin Vinranke, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 13/590,921

(22) Filed: Aug. 21, 2012

(65) Prior Publication Data

US 2013/0218419 A1 Aug. 22, 2013

(30) Foreign Application Priority Data

Aug. 25, 2011 (EP) ..................................... 11178814

(51) Int. Cl.
*B60R 21/0134* (2006.01)
*B60R 21/00* (2006.01)
*B60R 21/01* (2006.01)

(52) U.S. Cl.
CPC ............. *B60R 21/00* (2013.01); *B60R 21/0134* (2013.01); *B60R 2021/0002* (2013.01); *B60R 2021/01259* (2013.01)

(58) Field of Classification Search
CPC .... B60R 21/00; B60R 21/0134; B60R 21/36; B60R 21/38; B60R 2021/0002; B60R 2021/01259
USPC ............................................ 701/45; 180/274
See application file for complete search history.

(56) References Cited

U.S. PATENT DOCUMENTS

| 6,281,806 | B1 | 8/2001 | Smith et al. | |
| 7,669,685 | B2 * | 3/2010 | Takahashi et al. | 701/45 |
| 7,958,962 | B2 * | 6/2011 | Dukart et al. | 701/45 |
| 2004/0182629 | A1 | 9/2004 | Takahashi et al. | |
| 2004/0210367 | A1 * | 10/2004 | Takafuji et al. | 701/45 |
| 2006/0213714 | A1 | 9/2006 | Igawa | |
| 2007/0228704 | A1 | 10/2007 | Cuddihy et al. | |
| 2007/0228705 | A1 * | 10/2007 | Rao et al. | 280/735 |
| 2009/0171536 | A1 | 7/2009 | Zimmer | |
| 2009/0187321 | A1 | 7/2009 | Otsuka et al. | |

FOREIGN PATENT DOCUMENTS

| DE | 10326001 | 9/2004 |
| EP | 1705078 | 9/2006 |
| EP | 2081131 | 7/2009 |
| GB | 2436692 | 10/2007 |

OTHER PUBLICATIONS

European Search Report for Application No. 11178814.7 dated Feb. 3, 2012.

* cited by examiner

*Primary Examiner* — Helal A Algahaim
*Assistant Examiner* — Donald J Wallace
(74) *Attorney, Agent, or Firm* — Brooks Kushman P.C.

(57) ABSTRACT

A method is disclosed for determining whether it is necessary to utilize safety equipment of a vehicle. The method includes detecting an impending impact of an object with a vehicle's windscreen by obtaining data concerning the object from a vehicle-mounted vision sensor, analyzing the data to determine whether the object will impact the windscreen, and activating the safety equipment only if the windscreen impact is imminent.

20 Claims, 3 Drawing Sheets

METHOD, COMPUTER PROGRAM PRODUCT AND SYSTEM FOR UTILIZING VEHICLE SAFETY EQUIPMENT

CROSS-REFERENCE TO RELATED APPLICATIONS

This application claims foreign priority benefits under 35 U.S.C. §119(a)-(d) to EP 11178814.7, filed Aug. 25, 2011, the disclosure of which is incorporated in its entirety by reference herein.

TECHNICAL FIELD

The following concerns a method, computer program product and system for determining whether it is necessary to utilize safety equipment in a vehicle such as an internal and/or external air-bag, a liftable bonnet, the vehicle's brakes, steering intervention, and/or one or more alarms warning a user of the vehicle that the windscreen impact is imminent, as well as a vehicle comprising such a computer program product and/or system.

BACKGROUND

Many vehicles include a collision avoidance system that comprises a vehicle-mounted sensor to warn a driver of any dangers that may lie ahead on the road. Many vehicles also comprise safety equipment, such as an internal or an external airbag, which is arranged to be deployed if/when the vehicle collides with an object.

SUMMARY

The embodiments described herein provide an improved method for determining whether it is necessary to utilize a vehicle's safety equipment.

This is achieved by a method that comprises the step of detecting an impending impact of an object, such as a pedestrian, animal or any other object (other than a vehicle) which could potentially smash the windscreen of a vehicle if it made impact therewith, with a vehicle's windscreen by obtaining data concerning the object from a vehicle-mounted vision sensor, i.e. an image-capturing sensor, such as a monocular (or "mono") or stereo, monochrome or colour camera, such as a video camera, for capturing images continuously, periodically or on demand, analysing the data to determine whether the object will impact the windscreen and activating the safety equipment only if the windscreen impact is imminent.

An internal and/or external air-bag may for example be deployed when it is determined that an object that is moving across the vehicle's bonnet is moving towards the windscreen and will definitely or probably make contact with the windscreen. Using a method as described herein means that safety equipment, such as an air-bag, will only be deployed/used when necessary and at the right time. Since not all objects that move across a vehicle's bonnet will make contact with the windscreen a driver's vision will not for example be obstructed by deploying an air-bag when not necessary, such as when an object is sliding from one side of a vehicle's bonnet to the other in a direction parallel to the windscreen.

At least an image capturing part of the visual sensor may be mounted on the windscreen of the vehicle, behind the windscreen (for example on the vehicle's dashboard or on the vehicle's rear-view mirror) or in front of the windscreen, on the bonnet of the vehicle or in the grill area of the vehicle.

According to an embodiment described herein the method comprises the step of doing at least one of the following when it has been determined that the windscreen impact is imminent: deploying at least one internal and/or external air-bag, lifting the vehicle's bonnet to a predetermined height for example, activating or pre-activating the vehicle's brakes, activating steering intervention, warning a user, such as the driver, of the vehicle that the windscreen impact is imminent for example by means of a visible, audible or haptically detectable alarm.

According to a further embodiment described the method comprises the step of determining whether the impact is imminent by determining at least one of the following: the object's optical growth, i.e. the rate at which the size of the object in a series of images captured by the vision sensor is increasing or decreasing (depending on whether the vision sensor is mounted on in front of or on the windscreen, or behind the windscreen) the object's direction of travel, the size of the object, the type of the object, speed of the object and/or the distance and/or time to impact.

According to an embodiment described herein the method comprises the step of initiating the method when the object has made contact with part of the vehicle, such as the bonnet of the vehicle, or when the object is within a certain distance from the windscreen.

According to another embodiment described the vehicle-mounted vision sensor is arranged to capture low resolution images in order to reduce the image capture/analysis cycle time. When tracking an object that is moving relatively quickly, high frequency image analysis is necessary. The system may utilize existing vision sensors (such as object recognition or collision avoidance cameras) operating at an increased refresh rate. Normally a vision sensor detects an object and its position in front of a vehicle with a refresh rate of 20 Hz for example. In a collision with an object as described in this document the refresh rate needs to be increased to about 100 Hz for example. The system may for example change the refresh rate of at least one vision sensor by only focusing on any object within a predetermined distance from the vehicle, or by switching off a function of the vision sensor, such as line detection, or by reducing the vision sensor's resolution, whereby images of a lower resolution will be captured.

According to a further embodiment described herein the method comprises the step of illuminating the object using vehicle-mounted illumination means if illumination is required.

According to a further embodiment, a computer program product comprises a computer program containing computer program code means arranged to cause a computer or a processor to execute the steps of a method according to any of the embodiments described herein stored on a computer-readable medium or a carrier wave.

According to a further embodiment, a system is described in a vehicle for determining whether it is necessary to utilize the vehicle's safety equipment. The system comprises a vehicle-mounted vision sensor arranged to detect an impending impact of an object with a vehicle's windscreen, an analyzer, such as one or more signal processing and/or imaging electronics unit(s), arranged to obtain data concerning the object from the vehicle-mounted vision sensor, such as one or more images captured by the vision sensor, and to determine whether the object will impact the windscreen and an activator arranged to activate the safety equipment only if the windscreen impact is imminent.

According to an embodiment described the vehicle-mounted vision sensor comprises a mono or stereo camera.

According to another embodiment, the analyzer is arranged to do at least one of the following to determine whether the windscreen impact is imminent: deploy at least one internal and/or external air-bag, lift the vehicle's bonnet, activate or pre-activate the vehicle's brakes, activate steering intervention, warn a user of the vehicle that the windscreen impact is imminent.

According to a further embodiment described herein the analyzer is arranged to determine whether the object is approaching the windscreen by determining at least one of the following: the object's optical growth, the object's direction of travel, the size of the object, the type of the object, speed of the object, and/or the distance and/or time to impact.

According to another embodiment described the system comprises a vehicle impact sensor to detect whether the object has made contact with part of the vehicle, such as the front of the vehicle or the bonnet of the vehicle.

According to another embodiment, the vehicle-mounted vision sensor is arranged to capture low resolution images.

According to a further embodiment described, the system comprises vehicle-mounted illumination means to illuminate the object if illumination is required.

According to an embodiment described herein, the vision sensor is arranged to be sensitive to electromagnetic radiation within a predetermined wavelength range and the illumination means is arranged to emit electromagnetic radiation of a wavelength within the predetermined wavelength range, such as visible light or infra-red radiation. According to an embodiment, the illumination means may be arranged to illuminate the object on detection of an impact with the vehicle, or on detection of an object within a predetermined distance from said windscreen or at any other suitable time that allows for improved analysis of data obtained by the vision sensor.

The method, computer product, system and vehicle described herein concern a vehicle such as a car, truck, heavy goods vehicle, bus or any other vehicle that comprises a windscreen. Any such vehicle may comprise a computer program product according to any of the embodiments described herein and/or a system according to any of the embodiments described.

BRIEF DESCRIPTION OF THE DRAWINGS

The method, computer product, system and vehicle will hereinafter be further explained by means of non-limiting examples with reference to the appended schematic figures where.

It should be noted that the drawings have not necessarily been drawn to scale and that the dimensions of certain features may have been exaggerated for the sake of clarity.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
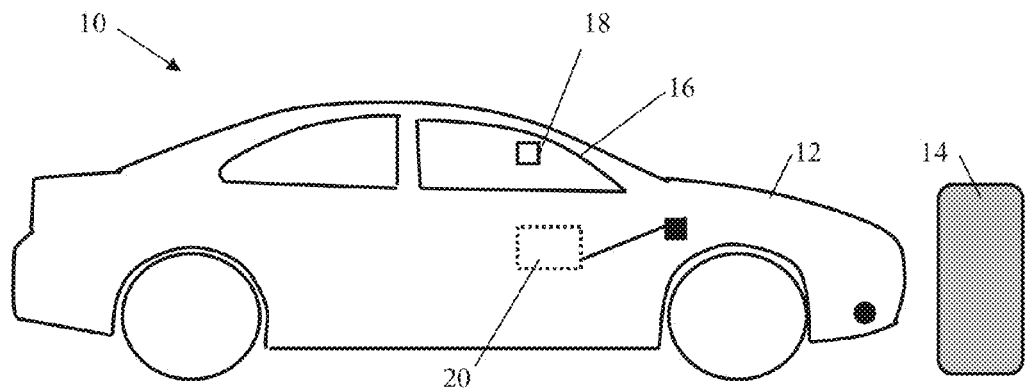
FIGS. 1-3 show a vehicle according to an embodiment hitting an object.
Figure 2:
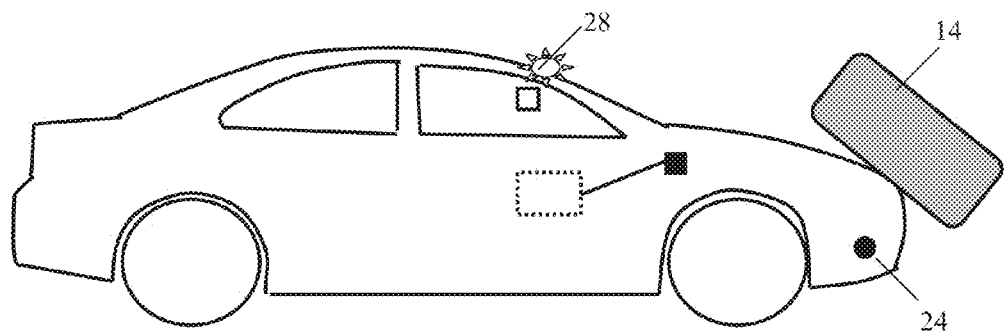
Figure 3:
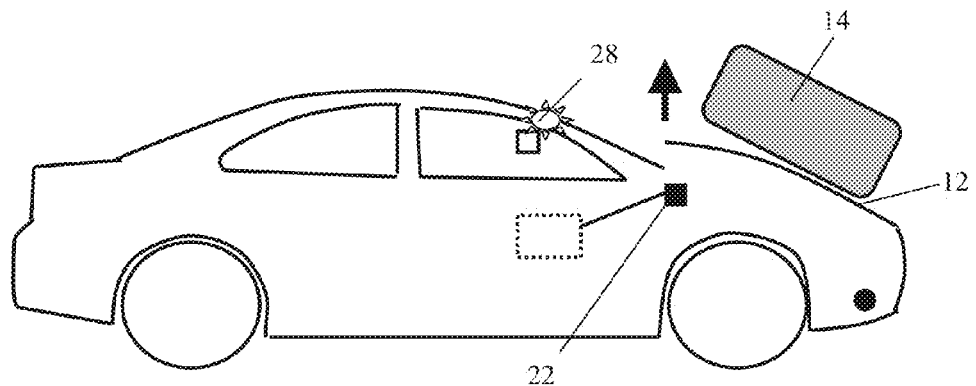

FIGS. 1-3 show a vehicle 10 according to one embodiment which comprises safety equipment 12 in the form of a bonnet that may be lifted to prevent or hinder an object 14 from impacting the windscreen 16 of the vehicle 10. The vehicle 10 comprises a system for determining whether it is necessary to utilize the vehicle's safety equipment 12, i.e. for determining if/when the bonnet 12 of the vehicle should be lifted. The vehicle 10 comprises a vision sensor 18 mounted in the vicinity of the windscreen 16 in the region of the rear-view mirror in the illustrated embodiment. The vision sensor 18 is arranged to detect an impending impact of an object 14 with the vehicle's windscreen 16. The vehicle 10 also comprises an analyzer 20 arranged to obtain data concerning the object from the vehicle-mounted vision sensor 18 and to determine whether any object 14 in the vicinity of the vehicle 10, within a predetermined distance from the windscreen 16 for example, will impact the windscreen 16 and an activator 22 arranged to activate the safety equipment 12 only if windscreen impact is imminent.

The vision sensor 18 may be a monochrome camera that presents an image of the view in front of the vehicle in black and white, or grayscale or a colour sensing vision sensor. The vision sensor 18 may be arranged to capture and optionally store any number of images at any suitable rate. The analyzer 20 may be arranged to detect an object 14 such as a pedestrian, animal or any other object that is not a vehicle, it may be arranged to detect the edge of an object, the position of an object by scanning captured images and using any suitable image analysis technique for example. It should be noted that the analyzer 20 need not necessarily be located in the vehicle 10 but may located remotely to the vehicle 10 in wireless contact therewith.

FIG. 1 shows a vehicle 10 before it hits an object 14. The vehicle 10 may comprise a vehicle impact sensor 24 located in the grill area of the vehicle 10 for example to detect whether the object 14 has made contact with part of the vehicle 10 (as shown in FIG. 2). Such vehicle impact may alternatively or additionally be detected by the vision sensor 18. The vision sensor 18 may be arranged to start capturing images, or to start capturing images at an increased rate, or to start capturing low resolution images to reduce the image capture/analysis cycle time, on receiving a signal from the vehicle impact sensor 24. It should however be noted that an object 14 need not necessarily need to come into contact with any part of the vehicle 10 to initiate the system for determining whether it is necessary to utilize a vehicle's safety equipment 12.

The analyzer 20 receives and analyzes data from the vision sensor 18 to determine whether the object 14 is approaching the windscreen 16 of the vehicle or not by determining at least one of the following: the object's optical growth, the object's direction of travel, the size of the object, the type of the object, speed of the object, and/or the distance and/or time to impact or any other parameter which gives an indication of the object's movement. Once the analyzer has determined that the object 14 is approaching the windscreen 16 of the vehicle 10 or that the object 14 is likely to approach the windscreen 16, the activator 22 will lift the bonnet 12 of the vehicle to deflect the object 14 away from the windscreen 16 of the vehicle 10 to prevent or lessen windscreen impact and/or to protect the object 14, should the object be a pedestrian for example.

Other safety equipment may be activated on detection of an imminent windscreen impact. For example an internal and/or external air-bag may be deployed, the vehicle's brakes may be activated or pre-activated, steering intervention may be activated, and/or a user may be warned that windscreen impact is imminent by means of providing an audible and/or visual alarm signal and/or a haptically detectable alarm signal, such as a vibrating steering wheel.

According to one embodiment, the vehicle 10 comprises illumination means 28 to illuminate the object 14 once the object is within a predetermined distance from the windscreen 16 or once the object 14 has made impact with the vehicle for example. The illumination means 28 may be arranged in any suitable position on the vehicle 10. Prior to the object 14 being illuminated with such designated illumination means 28, the object 14 will be illuminated by the vehicle's headlamps.

Figure 4:
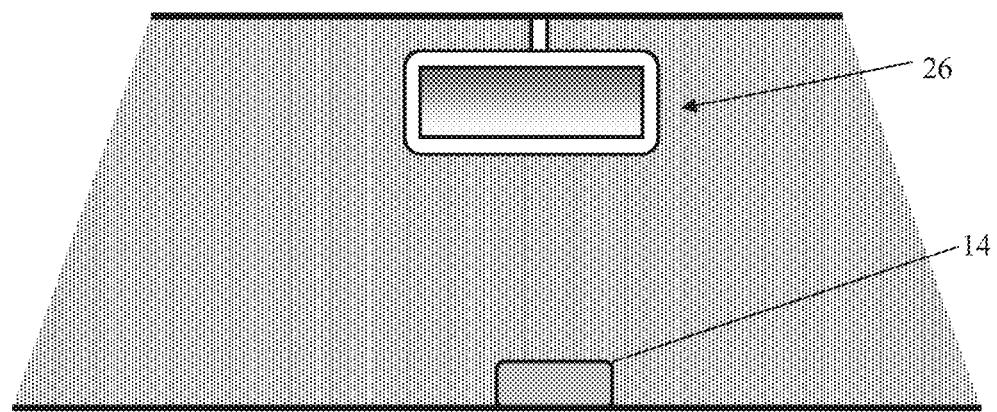
FIGS. 4-6 show images of an object approaching the windscreen of a vehicle according to an embodiment as seen from the driver's seat.
Figure 5:
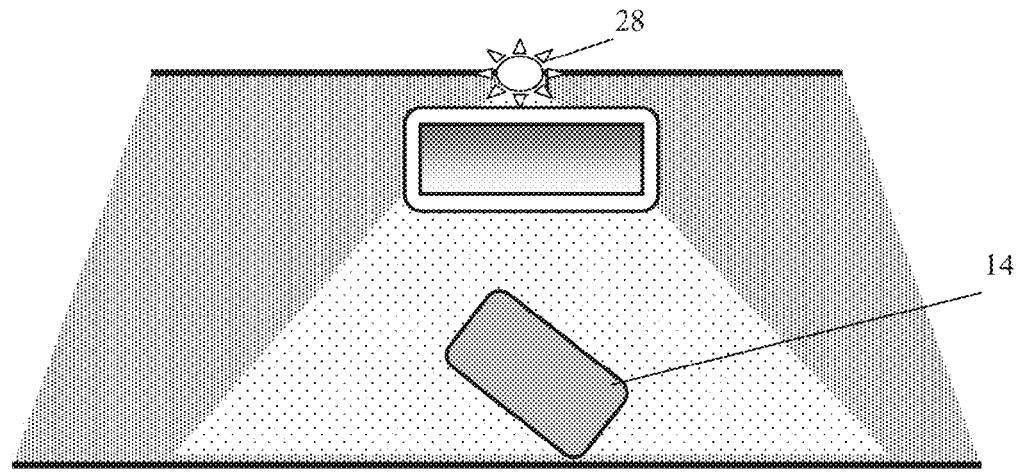
Figure 6:
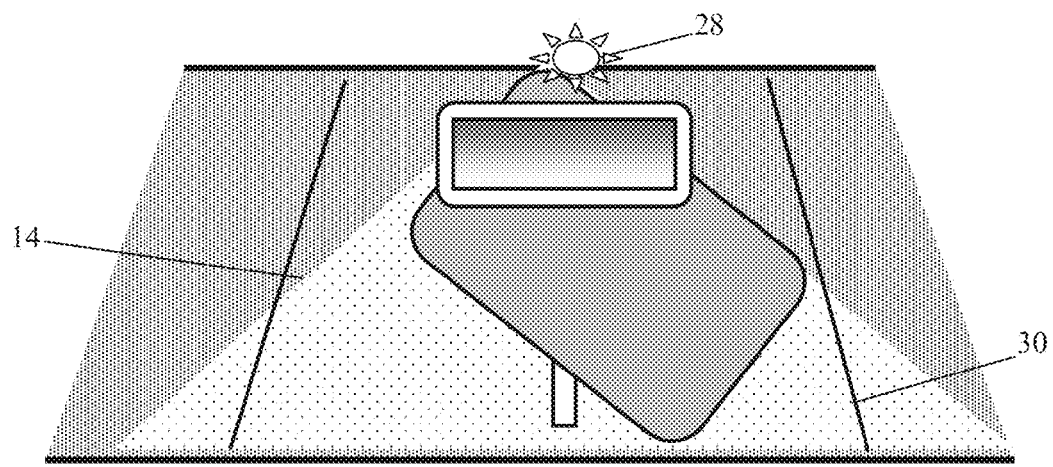

FIGS. 4-6 schematically show images of an object 14 approaching the windscreen of a vehicle as seen from the driver's seat of the vehicle. Images of the object 14 may be captured by a vision sensor 18 (not shown in FIGS. 4-6) mounted on a rear-view mirror 26. Once an object 14 has been detected to be within a predetermined distance from the windscreen of the vehicle or once a vehicle impact detector 24 has detected impact with an object 14 for example, vehicle-mounted illumination means 28 may be arranged to illuminate the object 14 to enable improved image capture and/or analysis. The vision sensor 18 may be arranged to be sensitive to electromagnetic radiation within a predetermined wavelength range and the illumination means 28 may be arranged to emit electromagnetic radiation of a wavelength within that predetermined wavelength range. As can be seen in FIGS. 4-6, the size of the object 14 in the images increases as the object approaches the windscreen of the vehicle. The vehicle's safety equipment 12 is used once it is determined that windscreen impact is imminent.

According to an embodiment, the image capturing means of a vision sensor 18 may be arranged to track the movement of an object 14. For example, FIG. 6 shows that the image capturing means of a vision sensor 18 may move or become angled downwards towards a road 30 on which the vehicle 10 is travelling in order to see the object 14 more clearly.

It should be noted that at least the image capturing means of a vision sensor 18 of a system according one embodiment may be mounted at the front of the bonnet 12 of the vehicle 10 facing the windscreen 16 whereby the size of any object 14 approaching the windscreen 16 of the vehicle 10 as captured by said vision sensor 18 would decrease as it approached the windscreen 16.

Figure 7:
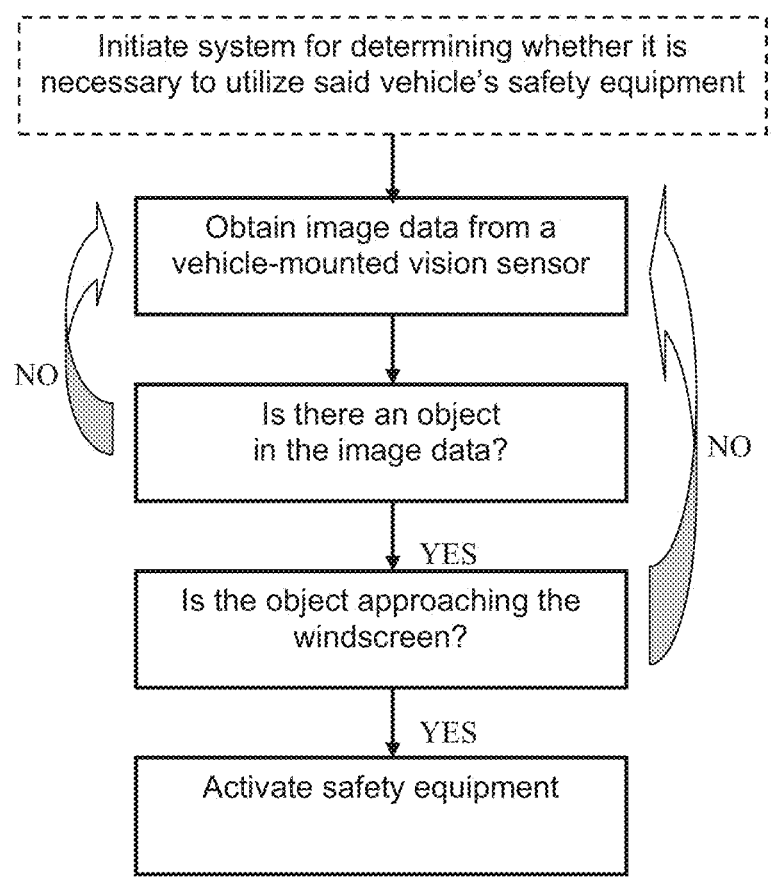
FIG. 7 is a flow diagram showing the steps of a method according to an embodiment described herein.

FIG. 7 shows a method according to one embodiment. The method comprises the steps of detecting an impending impact of an object with a vehicle's windscreen by obtaining data concerning the object from a vehicle-mounted vision sensor, analysing the data to determine whether the object will impact the windscreen and activating the safety equipment only if the windscreen impact is imminent. Optionally, the method may be initiated when a vehicle impact sensor 24 detects that the vehicle has hit an object 14 or when the vision sensor 18 detects an object 14 or an object 14 of a particular type or size. Alternatively, the method may be arranged to collect data from at least one vehicle-mounted vision sensor 18, such as a mono or stereo camera, continuously, periodically or on demand.

A computer program product comprising a computer program containing computer program code means arranged to cause a computer or a processor to execute the steps of a method according to any of the embodiments described may be stored on a computer-readable medium inside the vehicle, such as in the Electrical Control Unit (ECU) of a vehicle.

Further modifications within the scope of the claims would be apparent to a skilled person. The principles of the method, product, system and vehicle according to the embodiments described herein may be used to determine whether it is necessary to utilize safety equipment in any other part of a vehicle, such as the side of a vehicle by determining whether side impact is imminent.

While exemplary embodiments are described above, it is not intended that these embodiments describe all those possible. Rather, the words used in the specification are words of description rather than limitation, and it is understood that various changes may be made without departing from the spirit and scope of the following claims. Additionally, the features of various implementing embodiments may be combined to form further embodiments.

What is claimed is:

1. A method for determining whether it is necessary to utilize an internal airbag of a vehicle comprising:
    detecting an impending impact of an object with the vehicle that could potentially smash a windscreen of the vehicle by obtaining data concerning said object from a vehicle-mounted vision sensor;
    analyzing said data to determine whether said object will also impact said windscreen as a result of the impending impact; and
    activating said internal airbag in connection with the impending impact of the object with the vehicle to protect a driver of the vehicle only if said windscreen impact with the object is determined imminent, to prevent deployment of said internal airbag upon impact of the object with the vehicle if said windscreen impact with the object is determined unlikely so that a view of the driver remains unobstructed by said internal airbag.

2. The method according to claim 1 wherein said vehicle-mounted vision sensor comprises a mono or stereo camera.

3. The method according to claim 1 further comprising, when it has been determined that said windscreen impact is imminent, at least one of:
    deploying at least one external air-bag;
    lifting a bonnet of said vehicle;
    activating a brake of said vehicle;
    pre-activating a brake of said vehicle;
    activating steering intervention; and
    warning a user of said vehicle that said windscreen impact is imminent.

4. The method according to claim 1 further comprising determining whether said windscreen impact is imminent by determining at least one of an optical growth of said object, a direction of travel of said object, a size of said object, a type of said object, a speed of said object, a distance to impact, and a time to impact.

5. The method according to claim 1 further comprising at least one of:
    determining when said object has made contact with part of said vehicle; and
    determining when said object is within a certain distance from said windscreen.

6. The method according to claim 1 wherein said vehicle-mounted vision sensor is arranged to capture low resolution images.

7. The method according to claim 1 further comprising illuminating said object using vehicle-mounted illumination.

8. A system in a vehicle for determining whether it is necessary to utilize a vehicle internal airbag comprising:
    a vehicle-mounted vision sensor arranged to detect an impending impact of an object with the vehicle that could potentially smash a windscreen of the vehicle;

an analyzer arranged to obtain data concerning said object from said vehicle-mounted vision sensor and to determine whether said object will also impact said windscreen as a result of the impending impact; and an activator arranged to activate said internal airbag in connection with the impending impact of the object with the vehicle to protect a driver of the vehicle only if said windscreen impact with the object is determined imminent, to prevent deployment of said internal airbag upon impact of the object with the vehicle if said windscreen impact with the object is determined unlikely so that a view of the driver will remain unobstructed by said internal airbag.

9. The system according to claim 8 wherein said vehicle-mounted vision sensor comprises a mono or stereo camera.

10. The system according to claim 8 wherein said analyzer is further arranged to do at least one of the following when said windscreen impact is imminent: deploy at least one external air-bag, lift a bonnet of said vehicle, activate a brake of said vehicle, pre-activate a brake of said vehicle, activate steering intervention, and warn a user of said vehicle that said windscreen impact is imminent.

11. The system according to claim 8 wherein said analyzer is arranged to determine whether said object is approaching said windscreen by determining at least one of an optical growth of said object, a direction of travel of said object, a size of said object, a type of said object, a speed of said object, a distance to impact, and a time to impact.

12. The system according to claim 8 further comprising a vehicle impact sensor to detect whether said object has made contact with a part of said vehicle.

13. The system according to claim 8 wherein said vehicle-mounted vision sensor is arranged to capture low resolution images.

14. The system according to claim 8 further comprising vehicle-mounted illumination to illuminate said object.

15. The system according to claim 14, wherein said vision sensor is arranged to be sensitive to electromagnetic radiation within a predetermined wavelength range and said vehicle-mounted illumination is arranged to emit electromagnetic radiation of a wavelength within said predetermined wavelength range.

16. A non-transitory computer readable medium for use in determining whether to utilize an internal airbag of a vehicle, the medium comprising computer executable instructions for:
    detecting an impending impact of an object with the vehicle that could potentially smash a windscreen of the vehicle by obtaining data concerning said object from a vehicle-mounted vision sensor;
    analyzing said data to determine whether said object will also impact said windscreen as a result of the impending impact; and
    activating said internal airbag in connection with the impending impact of the object with the vehicle to protect a driver of the vehicle only if said windscreen impact with the object is determined imminent, to prevent deployment of said internal airbag upon impact of the object with the vehicle if said windscreen impact with the object is determined unlikely so that a view of the driver remains unobstructed by said internal airbag.

17. The computer readable medium of claim 16 further comprising instructions for, when it has been determined that said windscreen impact is imminent, at least one of:
    deploying at least one external air-bag;
    lifting a bonnet of the vehicle;
    activating a vehicle brake;
    pre-activating a vehicle brake;
    activating steering intervention; and
    warning a user of said vehicle that said windscreen impact is imminent.

18. The computer readable medium of claim 16 further comprising instructions for determining whether said windscreen impact is imminent by determining at least one of an optical growth of said object, a direction of travel of said object, a size of said object, a type of said object, a speed of said object, a distance to impact, and a time to impact.

19. The computer readable medium of claim 16 further comprising instructions for at least one of:
    determining when said object has made contact with a part of said vehicle; and
    determining when said object is within a certain distance from said windscreen.

20. The computer readable medium of claim 16 further comprising instructions for activating vehicle-mounted illumination for use in illuminating said object.

* * * * *